April 10, 1956 S. T. CARTER 2,741,389
MACHINE FOR LABELING CYLINDRICAL ARTICLES
Filed March 26, 1953 9 Sheets-Sheet 1

Inventor
Sidney T. Carter
by Roberts Cushman & Grover
att'ys.

April 10, 1956 S. T. CARTER 2,741,389
MACHINE FOR LABELING CYLINDRICAL ARTICLES
Filed March 26, 1953 9 Sheets-Sheet 2

April 10, 1956  S. T. CARTER  2,741,389
MACHINE FOR LABELING CYLINDRICAL ARTICLES
Filed March 26, 1953  9 Sheets-Sheet 3

Inventor
Sidney T. Carter
by Roberts Cushman & Grover
Att'ys.

Inventor
Sidney T. Carter
by Roberts Cushman & Grover
Att'ys.

April 10, 1956 S. T. CARTER 2,741,389
MACHINE FOR LABELING CYLINDRICAL ARTICLES
Filed March 26, 1953 9 Sheets—Sheet 5

Inventor
Sidney T. Carter
by Roberts, Cushman & Grover
att'ys.

April 10, 1956     S. T. CARTER     2,741,389
MACHINE FOR LABELING CYLINDRICAL ARTICLES
Filed March 26, 1953     9 Sheets—Sheet 7

Inventor
Sidney T. Carter

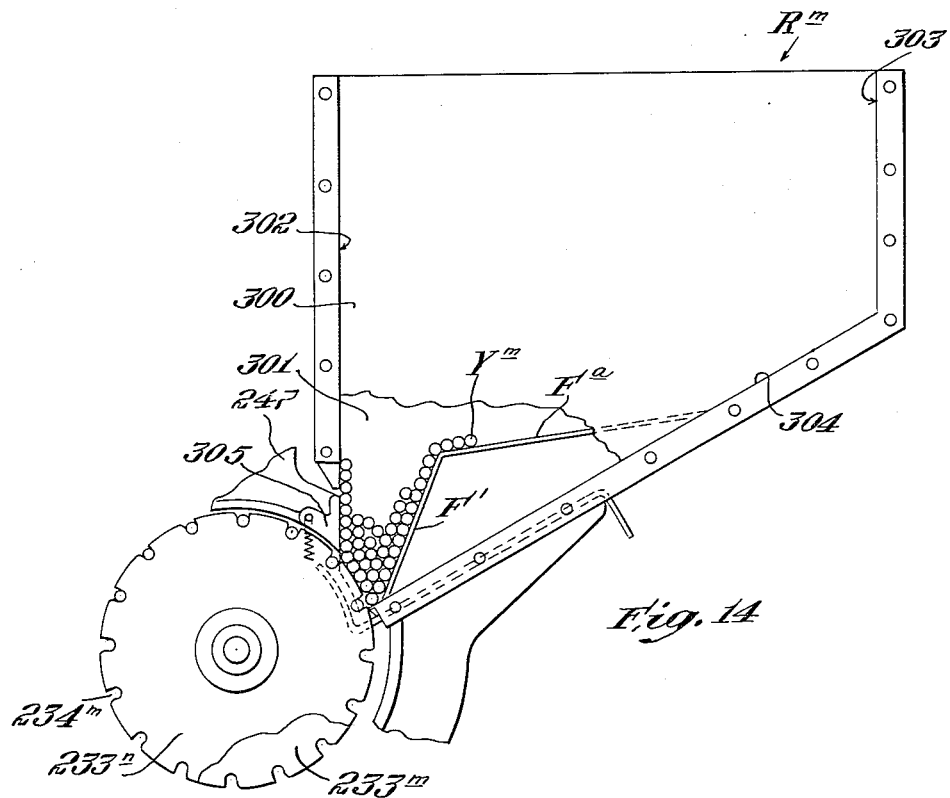
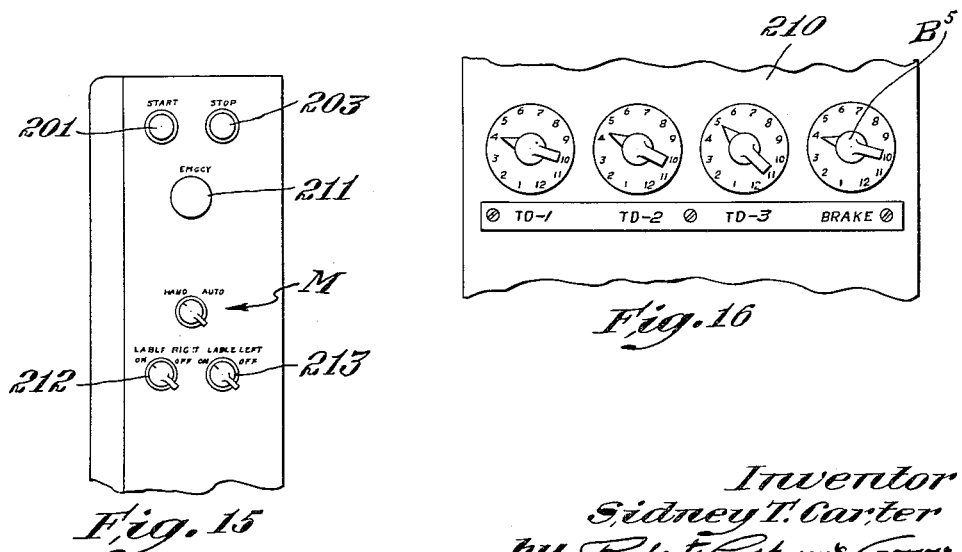

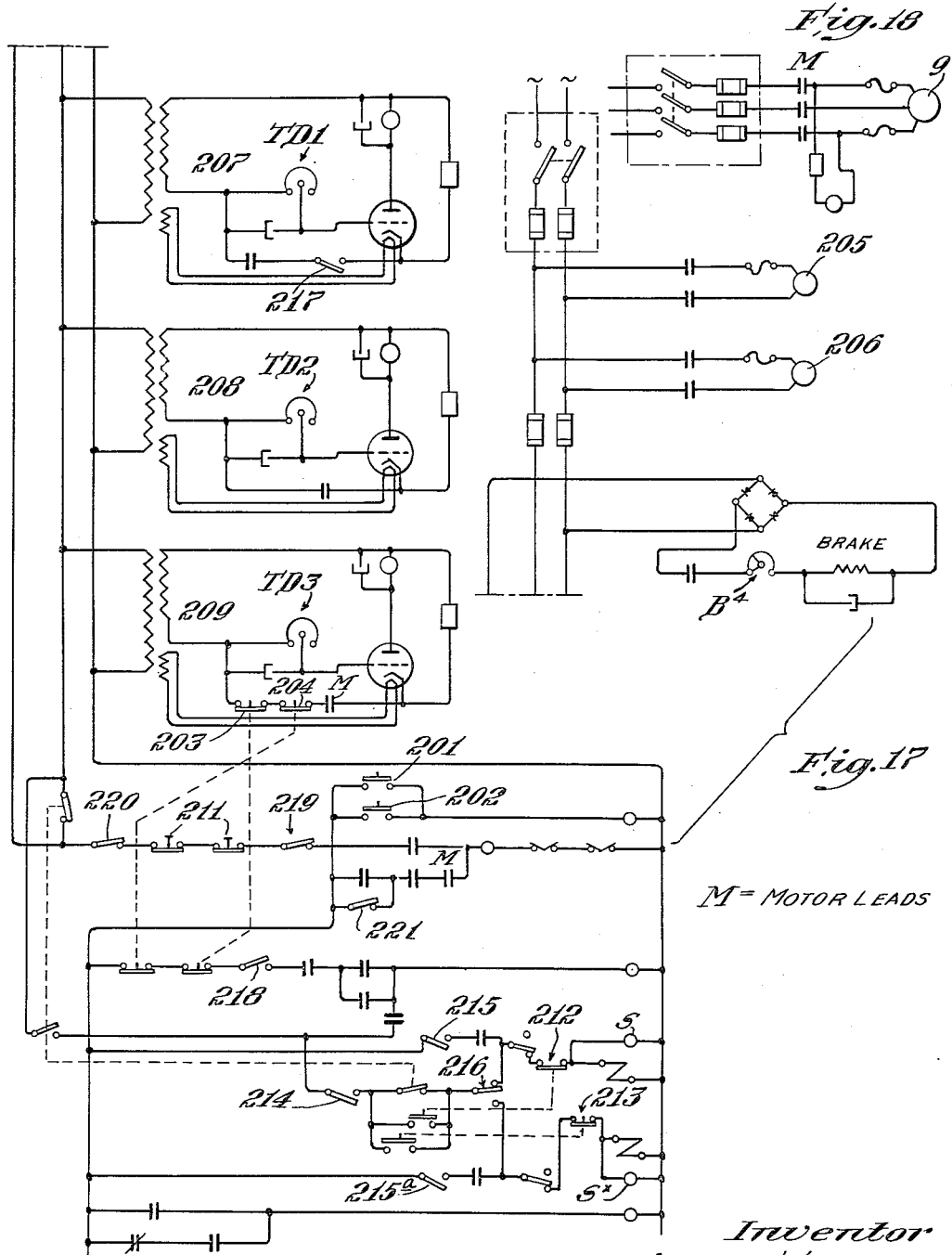

United States Patent Office 2,741,389
Patented Apr. 10, 1956

2,741,389

MACHINE FOR LABELING CYLINDRICAL ARTICLES

Sidney T. Carter, Shrewsbury, Mass., assignor to Geo. J. Meyer Manufacturing Co., Cudahy, Wis., a corporation of Wisconsin Application March 26, 1953, Serial No. 344,722

41 Claims. (Cl. 216—54)

This invention pertains to labeling machines of the kind wherein the articles to be labeled are fed from a supply to the label-applying device, one after the other automatically, and after being labeled are automatically discharged.

The patent to Carter No. 2,600,205, dated June 10, 1952, discloses a labeling machine of the hand-fed or semi-automatic type which embodies many very desirable features, such as certainty of withdrawal of labels from the magazine, uniform application of adhesive to the labels and accurate application of the labels to the article. Machines according to said patent have been found very satisfactory for the application of labels to bottles or other articles which are sufficiently large to make hand feeding of the machine practical. However, for small articles, for instance the cylindrical or tubular ampoules which are now so largely employed by the pharmaceutical companies for packaging single dose quantities of drugs for hypodermic use or bottles of generally similar size, hand feeding of a labeling machine such as that disclosed in the patent to Carter is unduly slow or, if speeding up of the operation be attempted, is attended with a high percentage of unlabeled bottles or breakage of the containers.

While of more general utility, the machine of the present invention is primarily intended for labeling cylindrical articles, for instance, bottles having cylindrical body portions as small as or smaller than ⅜ inch in outside diameter and of which the total height may be of the order of 1¾ inches. While such articles may be bottles as referred to, it is to be understood that the machine is intended for use in labeling articles, whether they be solid or hollow, and whether of glass or other material.

Objects of the invention are to provide a labeling machine of the automatic type capable of labeling small articles at a very high rate of speed; to provide an automatic labeling machine for applying labels to cylindrical articles or to articles having cylindrical label-receiving surfaces such, for example, as the ampoules or small bottles employed for packaging pharmaceutical preparations; to provide a labeling machine wherein the articles to be labeled, as received from a supply reservoir, are passed through a labeling zone while being rotated about their own axes thereby to facilitate the application of wrapper-type labels; to provide a labeling machine wherein cylindrical articles are delivered one by one from a source of supply and progressed through a labeling zone while being rolled along a predetermined path; to provide a labeling machine wherein successive articles, passing through a labeling zone, are supplied with labels from different magazines respectively; to provide a labeling machine wherein a transfer carriage receives labels alternately from two independent magazines and delivers the labels, so received, to successive articles of a series; to provide an automatic labeling machine capable of operation at high speed and which has the certainty and accuracy as to label-picking and application which is characteristic of the semi-automatic machine of the above-mentioned patent to Carter, and to provide means, including electronic circuits, for relatively timing the operation of certain parts, as more fully hereinafter described. Other and further objects and advantages of the invention will be pointed out in the following more detailed description wherein Fig. 1 is a diagrammatic, perspective view showing the machine of the present invetnion having associated therewith supply and delivery reservoirs;

Figure 13:
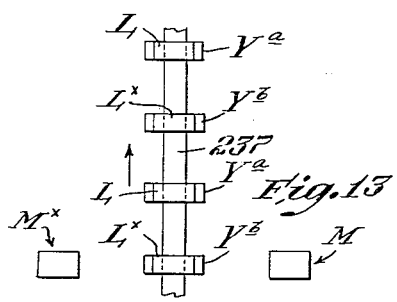

Figs. 9 to 12 inclusive are fragmentary elevations, omitting many of the parts and illustrating the cycle of operations;

Fig. 13 is a diagram illustrating the manner in which successive articles receive labels from different magazines;

Fig. 14 is a fragmentary side elevation of a modified type of magazine for the articles to be labeled;

Fig. 15 is a fragmentary elevation of one of the control panels;

Fig. 16 is a fragmentary elevation, illustrating a set of timing dials;

Fig. 17 is a wiring diagram illustrative of simple means for controlling the various activities of the mechanical parts, and Fig. 18 is a diagram of the wiring for the main motor circuit.

In the drawings, those elements which functionally correspond to parts disclosed in the above patent to Carter No. 2,600,205 are designated by the same numerals employed in the patent drawings, but in instances in which duplicate parts are employed in the machine of the present invention, one of said duplicate parts will be designated by said numeral with a superscript. Since many of the essential features of the machine herein claimed are disclosed and shown in detail in said Carter patent, such features are in many instances herein shown diagrammatically or omitted.

Figure 1:
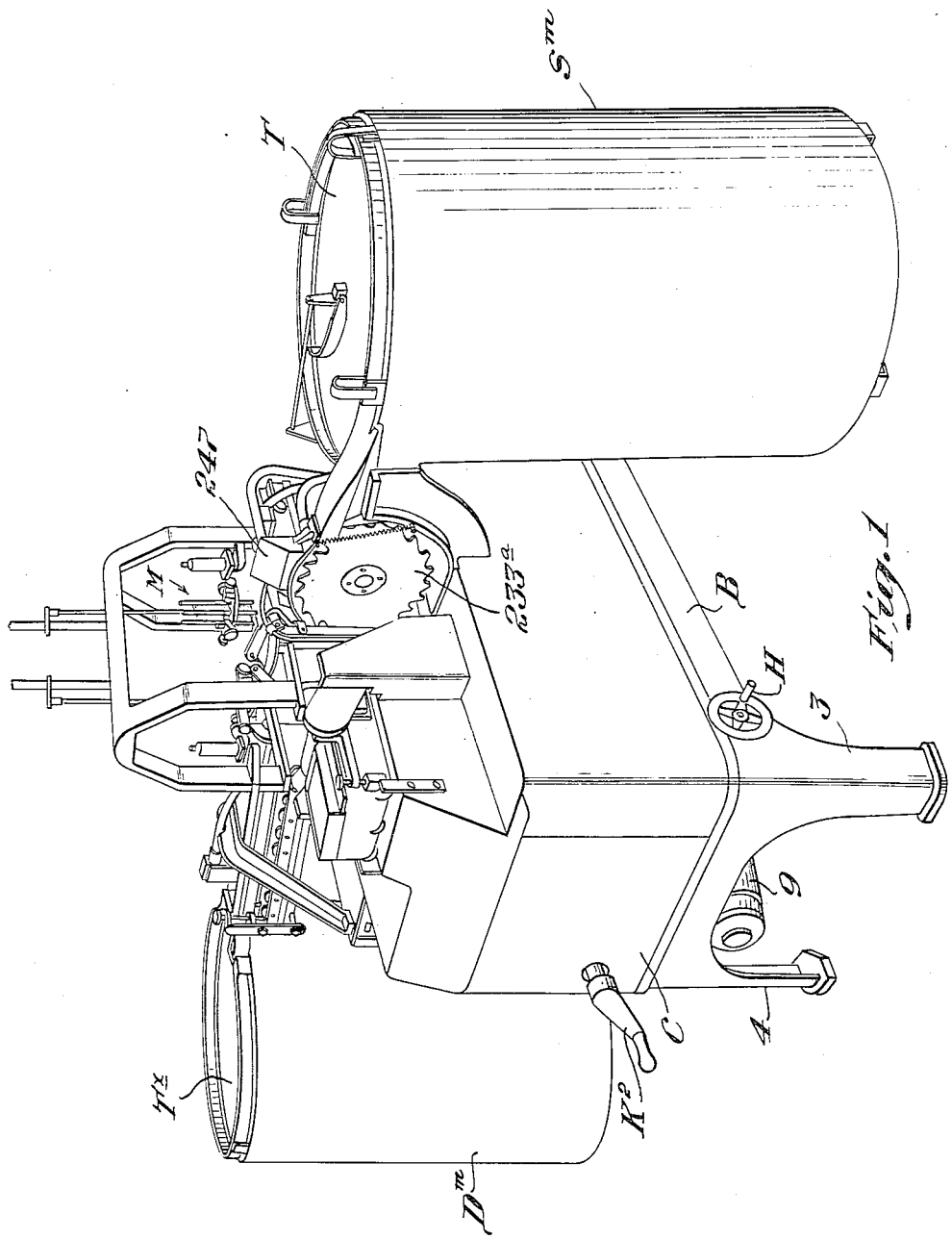
Figure 8:
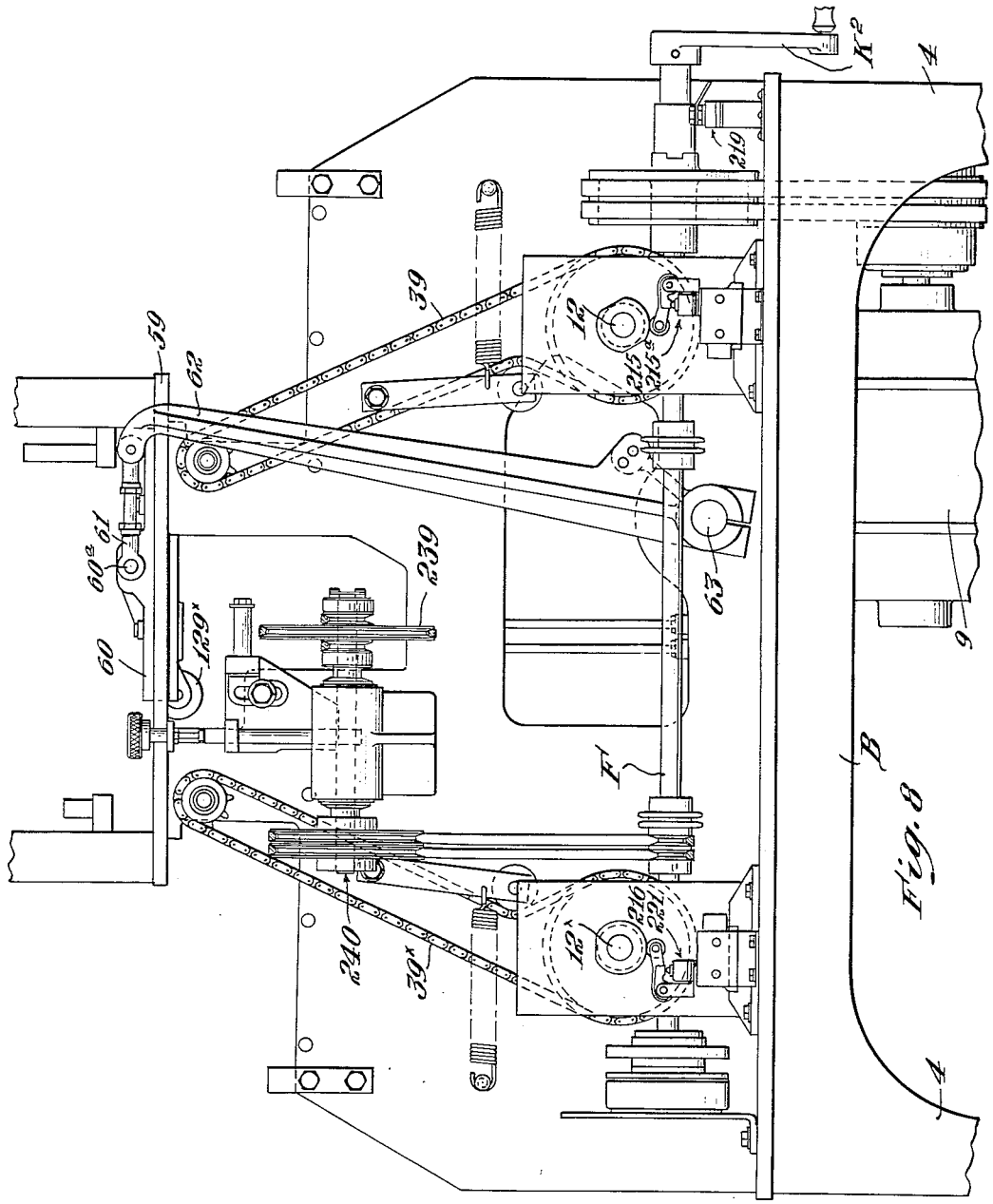
Fig. 8 is a diagrammatic elevation of the machine viewed from the rear or delivery end, omitting some parts.

In Figs. 1 and 8, the machine proper is shown as comprising a base B having front and rear legs 3 and 4. On this base are mounted the frame elements which support the operative parts. A casing of appropriate material and design (designated by the character C (Fig 1) rests upon the base and provides protection for much of the mechanism. Associated with the machine proper, as here illustrated, (Fig. 1) are supply and delivery reservoirs $S^m$ and $D^m$ respectively. The reservoirs here illustrated, by way of example, have horizontal turntables T and $T^x$ respectively on which the cylindrical bottles or other articles to be labeled are set with their axes vertical, the slow rotation of the turntable T feeding the articles one-by-one, in succession, to the machine while the rotation of the turntable $T^x$ moves the labeled articles in orderly succession away from the delivery end of the machine. While the type of reservoir or magazine here illustrated is convenient, it is to be understood that any other appropriate type of device, for instance endless chain conveyors, may be employed for feeding the articles to and for delivering them from the machine.

Most of the operative parts of the machine are driven by a motor 9 supported by the base B. The motor 9 drives a transverse shaft F through speed-reducing and varying means of any convenient type, including a magnetic switch and brake, and wherein the speed-varying means may, for example, have an actuating handle H (Fig. 1) for changing the speed of operation without stopping the motor. There are two transversely spaced, horizontal cam shafts 12 and 12$^x$ (Fig. 7), these shafts being turned in opposite directions and in accurately timed relation. On these shafts the cam disks 16 and 16$^x$ (Fig. 7) are mounted.

Figure 2:
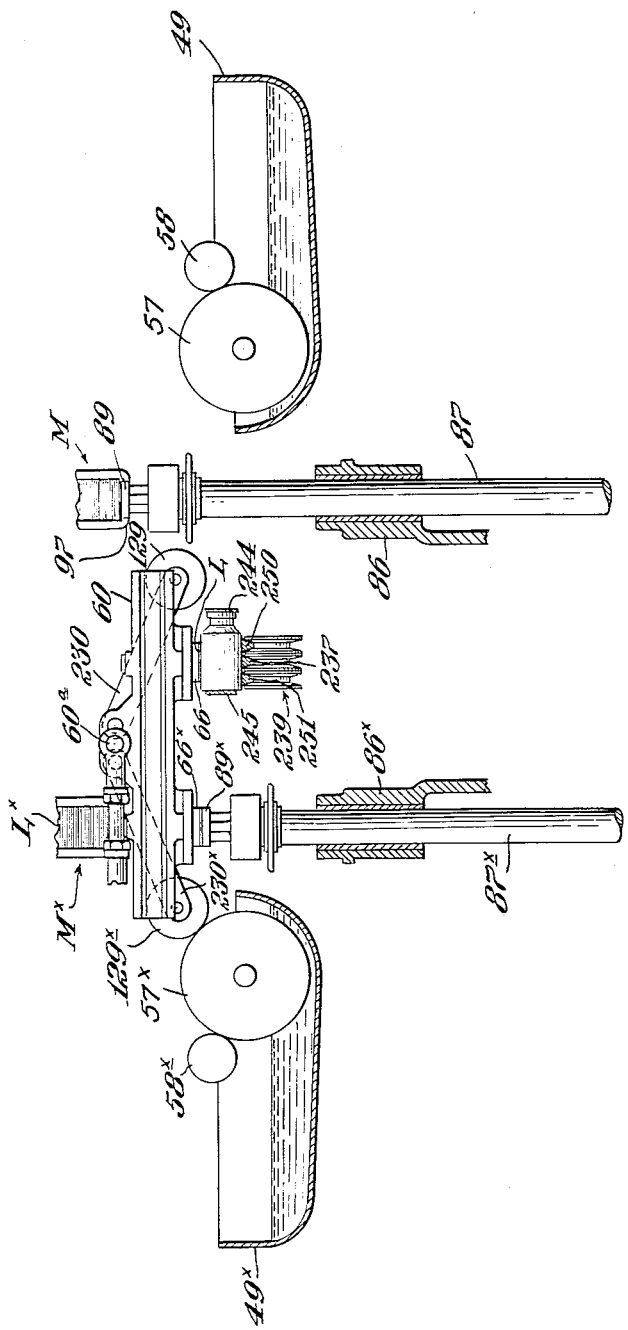
Fig. 2 is a fragmentary, diagrammatic transverse vertical section, to much larger scale than Fig. 1, in a plane defined by the axes of the two picker stems, omitting many parts.

Sprocket wheels fixed to the shafts 12 and 12$^x$ respectively drive chains 39 and 39$^x$ (Fig. 8) which turn the shafts of the glue elevating rolls 57 and 57$^x$ (Fig. 2) in the gum boxes 49 and 49$^x$ respectively. As shown, scraper rolls 58 and 58$^x$ are associated with the rolls 57 and 57$^x$ respectively.

Figure 6:
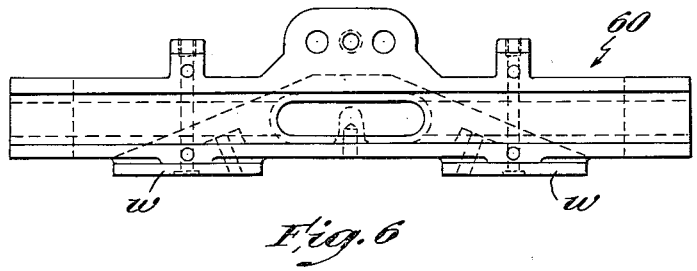
Fig. 6 is a side elevation of the transfer carriage.
Figure 7:
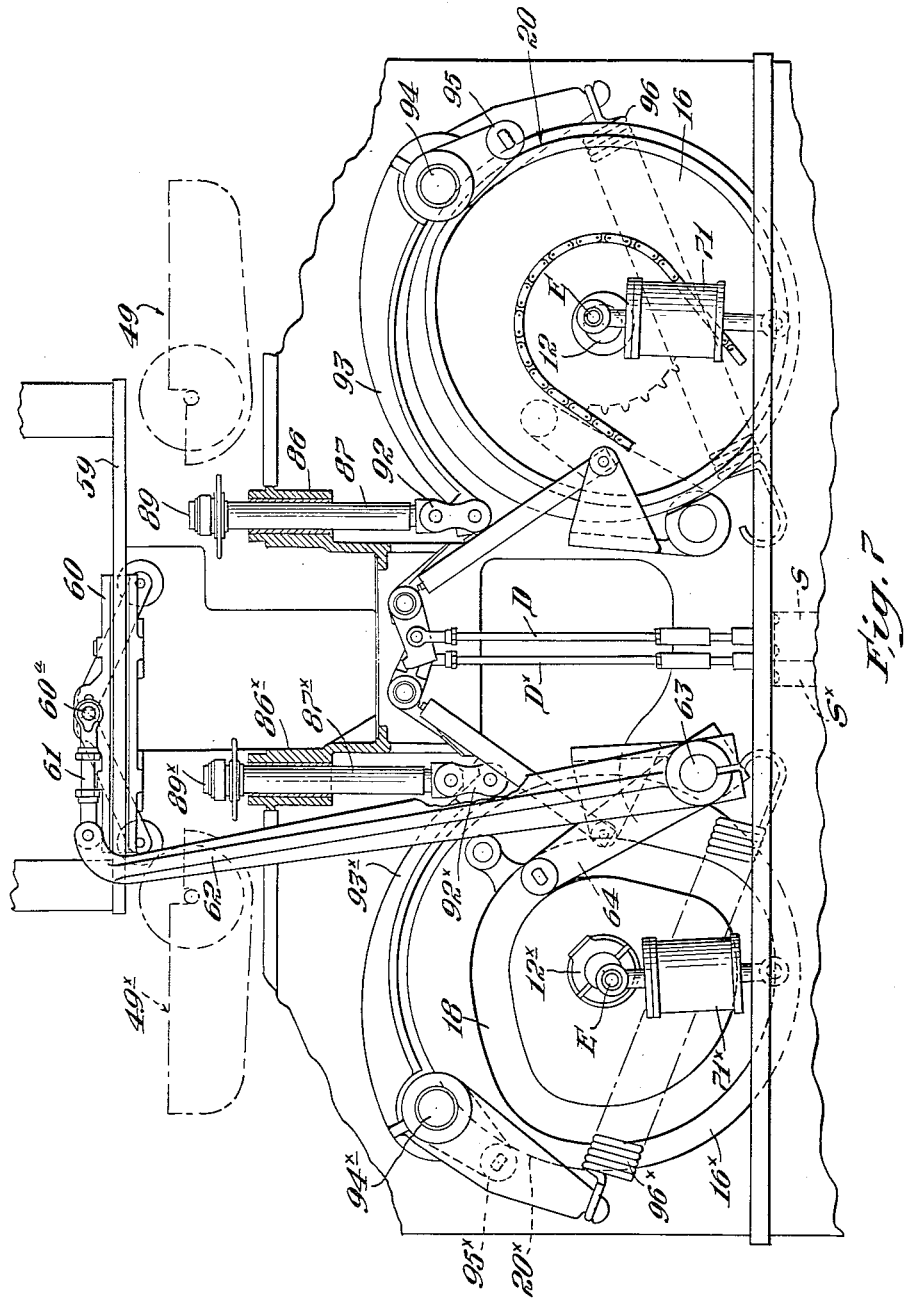
Fig. 7 is a fragmentary elevation, partly in vertical section on the plane of the axes of the picker stems, looking rearwardly, that is from the feed end of the machine.

At the upper central portion of the machine, horizontal, fixed, parallel guide rails 59 (Fig. 3) are arranged. These guide rails extend transversely across the centrally located label-applying station from a point near the inner edge of the gum box 49 to a point near the inner edge of the gum box 49$^x$. These rails define a path for the label-transfer carriage 60 (Figs. 2, 3 and 6) which slides transversely along these rails. This carriage has upstanding ears at its opposite sides from which project the pins 60$^a$ (Fig. 7). To each respective pin there is pivotally secured one end of a link 61 (Figs. 7 and 8), the rear ends of the links being pivotally secured to the upper parts of the long upright rock arms 62 (Figs. 7 and 8). One of these rock arms 62 is arranged at each side respectively of the machine, the lower ends of these arms being fixed to a horizontal shaft 63. An actuating arm 64 (Fig. 7) is fixed to the shaft 63 and at its upper end carries a cam follower roll which engages a cam groove 18 (Fig. 7) in the cam disk 16$^x$. This cam groove is of a contour such as to move the carriage 60 back and forth along the guide rails 59 in properly timed relation to the other parts of the mechanism.

The transfer carriage 60 has two horizontally spaced bosses W (Fig. 6) near its opposite ends respectively to which pneumatic pick-up or transfer pads 66 and 66$^x$ (Fig. 2) are attached. Each of these pads may, for example, be of the construction more fully described in the aforesaid patent to Carter, each pad having a multitude of suction orifices which communicate with corresponding chambers within the opposite ends of the body of the transfer carriage 60. These respective chambers in the transfer carriage communicate, by means of flexible conduits, with air pumps 71 and 71$^x$ respectively (Fig. 7) which may be of the kind more fully disclosed in the aforesaid Carter patent, the pumps and their valves being actuated at the appropriate times by eccentric pins E projecting from the ends of the shafts 12 and 12$^x$ respectively.

The machine frame (Figs. 2 and 7) is provided with laterally spaced, fixed bearing sleeves 86 and 86$^x$ which form guides for the vertically movable picker stems 87 and 87$^x$ respectively, whose axes are adjacent to but spaced inwardly from the inner edges of the respective gum boxes 49 and 49$^x$. Adjustably and removably mounted on the upper ends of the picker stems are the picker plates 89 and 89$^x$ respectively, each picker plate having a smoothly finished, horizontal upper surface designed to receive a coating of glue.

At their lower ends the picker stems 87 and 87$^x$ are pivotally connected (Fig. 7) by links 92 and 92$^x$, respectively, to the inner ends of the curved picker actuating levers 93 and 93$^x$ whose lower, outer ends are mounted to turn on fixed shafts 94 and 94$^x$, respectively. The levers 93 and 93$^x$ have downwardly extending arms provided with cam follower rolls 95 and 95$^x$, respectively, which bear against the peripheral cam surfaces 20 and 20$^x$ of the cam disks 16 and 16$^x$, respectively. A spring 96 tends to swing the arm 93 in a clockwise direction, as viewed in Fig. 7, and a similar spring 96$^x$ tends to swing the arm 93$^x$ in a counterclockwise direction. Such movement of the arms 93 and 93$^x$ moves the picker plates 89 and 89$^x$ upwardly toward the magazines M and M$^x$ (Fig. 2) which are arranged directly above the respective pickers and in which stacks of labels L and L$^x$ are held in the usual manner by supporting fingers 97.

As above noted, upward motion of the respective picker plates 89 and 89$^x$ toward the corresponding magazines is accomplished by the springs 96 and 96$^x$, respectively. The cams 20 and 20$^x$ move the plates downwardly. At times, for example, when first starting the machine, it may be desirable to prevent the pickers from contacting labels in the magazines, and for this reason appropriate picker stop mechanism may be provided, for example, such as is disclosed in greater detail in the above patent to Carter. The stop mechanism disclosed in said patent includes a manually actuable handle D which may be positioned at will so as temporarily to prevent the picker from rising to label-receiving position. In accordance with the present invention the manually actuable handle of the Carter patent is replaced by links D and D$^x$ (Fig. 7), one for each of the levers 93 and 93$^x$, respectively, which extend downwardly and whose lower ends are fixed to the cores of push-type solenoids S, S$^x$ to which electric current is applied under control of appropriate switches. The links D and D$^x$ are urged downwardly by means of a spring (not shown) which pulls them down so that their respective latch members are engaged with their respective picker arms 93 and 93$^x$ when the solenoids are not energized, thus limiting the picking motion. When either or both of the solenoids is energized, its core is pushed upwardly, thus pulling down the corresponding linkage so as to allow the corresponding picker plate to approach its magazine to perform its normal picking function.

The transfer carriage 60 (Fig. 2) is provided with horizontal pivot pins on which the frames 230 and 230$^x$ are pivoted to swing about axes at opposite sides, respectively, of the axis of the pin 60$^a$. These frames extend toward opposite ends, respectively, of the carriage 60, and at their free outer ends carry the freely rotatable glue applying rolls 129 and 129$^x$, respectively. Desirably the glue applying rolls are of the kind more fully described in the copending application for Letters Patent, Serial No. 288,876, filed by Carl Holm on May 20, 1952. Since the rolls are supported by the freely swinging frames 230 and 230$^x$, the rolls are capable of applying glue to the picker plates 89 and 89$^x$ whether the latter are located at normal transfer level or at a lower preliminary gumming level which they may occupy when the machine is first starting.

Figure 3:
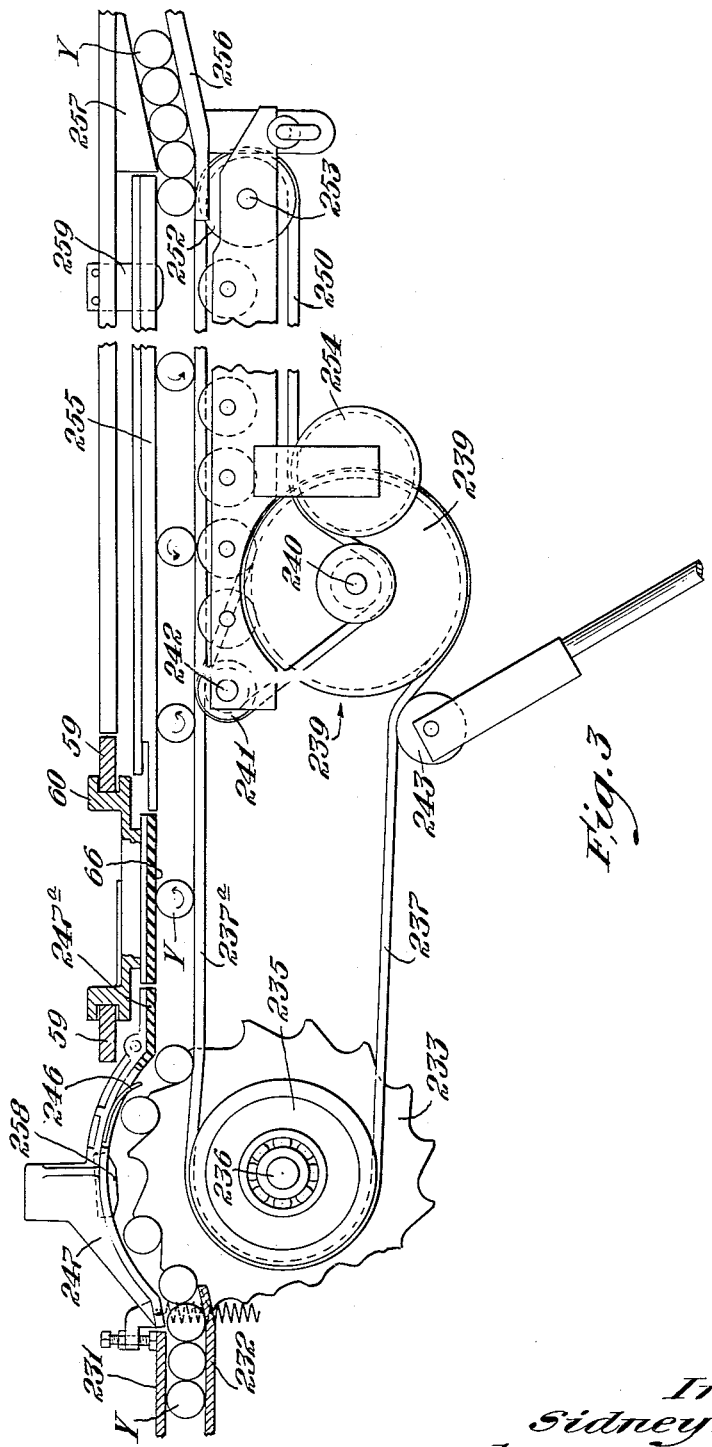
Fig. 3 is a fragmentary, vertical section in a plane perpendicular to that of Fig. 2 and approximately midway between the axes of the picker stems.

In accordance with the present invention the articles to be labeled are moved in succession to and from a label applying station which is located midway between the axes of the picker stems 87 and 87$^x$. Means for moving the articles is best illustrated in Fig. 3.

Figures 4, 5:
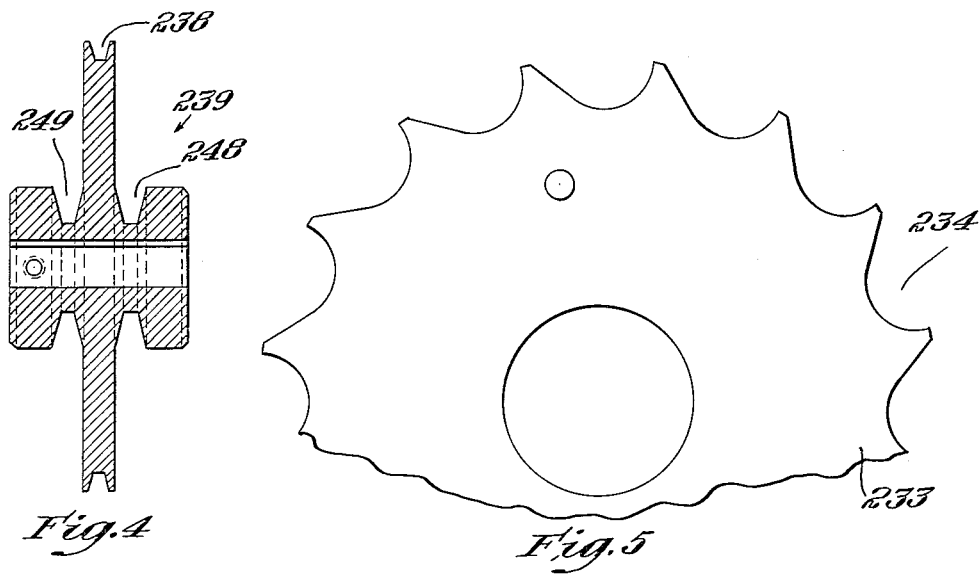
Fig. 4 is a diametrical section through the axis of the drive pulley for the feed and wiper belts.
Fig. 5 is a fragmentary, side elevation showing one form of star wheel for delivering the articles to the feed belt.

From the supply reservoir T (Fig. 1) the articles to be labeled (here shown as cylinders Y) are delivered through a guide scroll, or other appropriate means, so that their axes become horizontal, into a channel defined by the upper and lower fixed guides 231 and 232. From this channel the articles are picked up one by one by a rotary feed device comprising two coaxial, spaced star wheels 233 and 233$^a$ (Figs. 1 and 3) having peripheral pockets 234 (Fig. 5) each shaped to receive one of the articles Y. The star wheels 233 and 233ᵃ are so connected, in fixed relation to each other, that corresponding peripheral pockets are in accurate alignment. The two star wheels are keyed to the shaft 236, and between these star wheels is a pulley 235 which turns freely on the shaft 236. The pulley 235 has a V-groove which receives a V-belt 237 (Fig. 3) which is also received in the center V-groove 238 (Fig. 4) of a triple drive pulley 239 fixed to a shaft 240 (Fig. 3) which is driven by means of appropriate connections from the shaft F. A guide pulley 241, turning on shaft 242, supports the feed belt 237 so as to provide a horizontal upper run 237ᵃ onto which the articles Y are delivered by the duplex star wheel 233 and 233ˣ. A conventional tensioning pulley 243 keeps the belt 237 taut. The upper run 237ᵃ of the feed belt 237 is disposed in a horizontal plane spaced from the plane of the lower surfaces of the pads 66 and 66ᵃ of the transfer carriage a distance which substantially equals the diameter of the article Y, the run 237ᵃ of the feed belt being directly below the midpoint of the path defined by the rails 59. With this arrangement an article delivered onto the run 237ᵃ of the feed belt by the star wheel device will contact a label L (Fig. 2) held by suction against the lower surface of one or the other of the pads 66 or 66ˣ when such pad is at the inner end of its path of motion. Assuming that a label L is adherent to the undersurface of one of the pads when the latter occupies this position and that the undersurface of the label has a coating of adhesive, the frictional engagement of the feed belt with the periphery of the article Y will cause the latter to roll along beneath the pad and, when it engages the sticky surface of the label, the latter will be caused to wrap about the article. To prevent endwise movement of the article, fixed but relatively adjustable guide rails 244 and 245 (Fig. 2) are arranged so as to be disposed at the opposite ends of the article. Desirably a spring finger 246 overhangs the delivery portion of the duplex star wheel so as to restrain the article Y as the latter moves down toward the plane of the feed belt. A gate 247 (having a slot in its rear portion for the reception of the spring) confines the articles Y as they are advanced by the star wheel toward the horizontal run 237ᵃ of the belt. The gate 247 has a horizontal terminal portion 247ᵃ whose lower surface is in substantially the same horizontal plane as the lower surfaces of the suction pads of the transfer carriage.

The triple drive pulley 239 (Figs. 3 and 4) has V-grooves 248 and 249 at opposite sides of its central part which has the groove 238. The grooves 248 and 249 are of substantially lesser diameter than that of the groove 238. Endless belts 250 and 251 (Fig. 2) engage the grooves 248 and 249, respectively, so as to be driven by the triple pulley, these belts also engaging grooves in an idler pulley 252 (Fig. 3) on a shaft 253. They also engage grooves in the pulley 241 and are held taut by tension pulleys 254. The pulleys 241 and 252 define upper, horizontal runs of the belts 250 and 251 which are aligned with the horizontal run 237ᵃ of the feed belt 237. Above these horizontal upper runs of the belts 250 and 251 there is arranged a vertically yieldable wiper plate 255 having a smooth, horizontal undersurface, the plate being so supported that it bears with substantial pressure (for example, by its own weight) on the articles Y which have received labels and which are being advanced while rolling toward the delivery end of the machine by frictional engagement with belts 250 and 251. The pressure of the plate 255, as the articles are rolled along underneath it, assures a firm and uniform adhesion of the labels. The labeled articles are delivered by the wiper belts 250 and 251 onto a fixed guide 256 which cooperates with a second fixed guide 257 to define an upwardly inclined channel into which the articles are pushed one by one by the action of the belts 250 and 251 and eventually ejected onto the table T' of the delivery reservoir.

In order to prevent continued operation of the machine in the absence of articles to be labeled or in the absence of labels in the magazine or to prevent the picking operation before the pickers have been properly coated with adhesive, as well as for the control of the orderly functioning of other parts of the machine, appropriate detector elements are arranged at suitable points. Two such detector elements are shown at 258 and 259 (Fig. 3).

A normal cycle of operation of each individual picker is substantially like that of the picker of the above Carter patent, but in accordance with the present invention the cycles of the two pickers are so inter-related that while one picker is taking a label from its corresponding magazine, the other is delivering a label to the transfer carrier, and vice versa, thus greatly speeding up the labeling operation, and at the same time making it possible to apply different labels to articles being fed from the same supply.

Referring to Figs. 9 to 12, which are diagrams illustrative of successive steps in a normal cycle of operations, it is assumed that the magazines M and Mˣ have been supplied with labels L and Lˣ; that the gum boxes 49 and 49ˣ have been furnished with adhesive and that the machine has been in operation for a sufficient time to insure that the pickers are receiving gum at each cycle.

Figure 9:
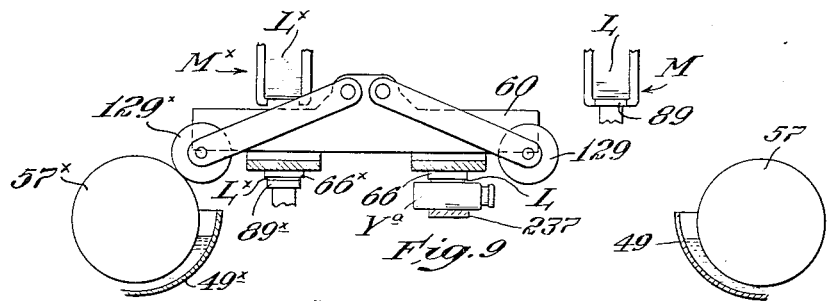
Figure 10:
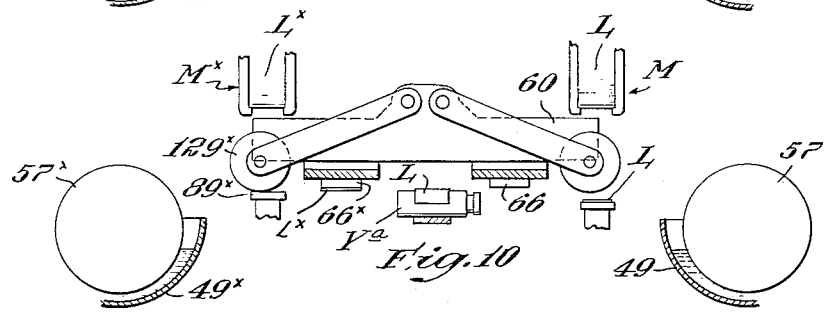

As diagrammatically illustrated in Fig. 9, the transfer carriage 60 is dwelling at the left-hand end of its stroke with the transfer pad 66 at the label-applying station and holding a label L in position to be contacted by an article Yᵃ which is being rolled along by the feed belt 237. At the same time, the pad 66ˣ is in transfer relation to the picker 89ˣ so as to receive a label Lˣ from the latter; the gum-applying roll 129ˣ is taking gum from the gum elevating roll 57ˣ and the picker 89 has risen to its highest point to take a label L from the magazine M.

The carriage 60 now starts to move to the right (Fig. 10) while the picker 89 moves down to a low, idle position carrying a label L. The pad 66 has moved to the right, away from the label-applying station, and the label L has adhered to the article Yᵃ (Fig. 13), which is rolling away from the label-applying station on the belt 237. The pad 66ˣ has taken the label Lˣ from the picker 89ˣ and is moving it toward the label-applying station while the roll 129ˣ is applying a fresh coating of adhesive to the picker 89ˣ.

Figure 11:
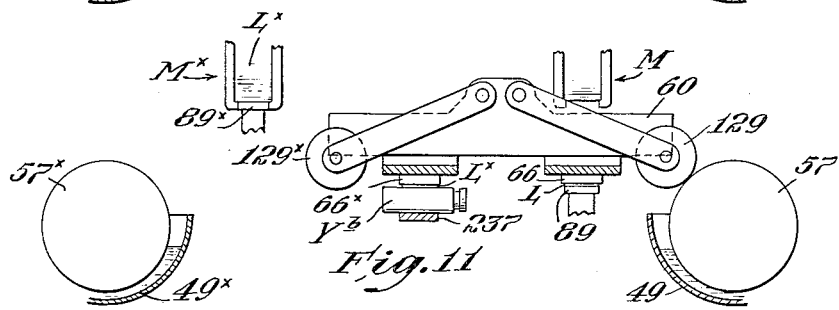

In Fig. 11, the transfer carriage 60 is shown as dwelling at the right-hand limit of its stroke. The picker 89ˣ has risen to its highest position to take a fresh label Lˣ from the magazine Mˣ; the pad 66ˣ is holding a label Lˣ at the label-applying station where it is being contacted by the next successive article Yᵇ which is being rolled along by the feed belt 237; the pad 66 is in transfer relation to the picker 89 which has risen from its low idle position to the transfer position and the roll 129 is taking adhesive from the roll 57.

Figure 12:
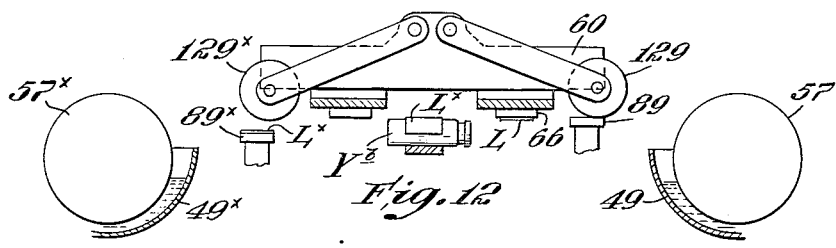

The transfer carriage 60 now starts its return stroke to the left. As shown in Fig. 12, the picker 89ˣ has moved down to its low idle position carrying with it a label Lˣ; the previous label Lˣ, which in Fig. 11 was shown adhering to the pad 66ˣ, has been taken by the article Yᵇ (Fig. 13) about which it is being wrapped, the article now being carried away from the label-applying station by the belt 237; the pad 66 has taken the new label L from the picker 89, and the roll 129 is applying a fresh coating of adhesive to the picker 89. At the end of this stroke the carriage 60 will occupy the position of Fig. 9, thus completing the cycle.

The result of this type of operation is diagrammatically indicated in Fig. 13 which may be considered to be a plan view showing a series of articles Yᵃ, Yᵇ, Yᵃ, Yᵇ, in alternation, resting upon and being moved along in the direction of the arrow by the belt 237, the label magazines M and Mˣ being located at the right and left respectively of the belt. The above described cycle of operations of the machine has the effect of applying labels from the magazine M to alternate articles of the series carried by the belt, that is to say the articles Y$^a$ as shown in Fig. 13, while the intervening articles Y$^b$ are supplied with labels from the magazine M$^x$. Thus, if the magazines be supplied with labels of different kinds, the machine will apply different labels to alternate articles delivered from the same supply.

While the operation of the machine might be controlled mechanically, it is preferable to employ electrical means, in particular, because by the use of electrical circuits, a very effective control is obtainable without necessitating the use of complicated timers or the like. Briefly stated, the electrical system is so devised as to insure the following operations:

A. When starting, regardless of the number of bottles in the machine in position to be labeled, the machine will operate a predetermined number of cycles to properly distribute the adhesive over the picking surface before a label is applied to the bottle or container. This starting cycle can be manually adjusted to suit any operating condition.

B. When the machine is running it will only pick a label if there is a bottle in position to receive the label.

C. When stopping, the instant the stop button is pushed, the labeler automatically stops picking labels but continues to run a predetermined number of cycles allowing the last label picked from the label holder to be applied and properly wiped before the machine stops. This stopping cycle can be manually adjusted to suit any operating condition.

D. When the machine finally stops, as outlined in "C" above, the machine will automatically stop at a predetermined position so that the transfer rolls will be free from the gum boxes and the picker faces.

E. A manually operable emergency stop button is provided. The actuation of the button stops the entire machine at once, without completion of the normal stopping cycle.

F. The labeler is equipped with electrical safety devices which are fully automatic. During the normal running of the labeler, if a jam occurs in the feed end or at the discharge end of the machine, the function of these safety devices are to automatically put the machine into the stopping cycle which performs the same operation automatically that would happen if the operator pushed the stop button. (See paragraph "C" above.)

G. If the jam at the feed end is of such nature that the bottle or container has passed the safety stopping position and may cause damage to the labeler, or the bottle, the emergency stop is automatically actuated by another switch and the entire machine stops at once.

In Figs. 17 and 18 an electrical circuit useful for controlling the various functions of the machine is diagrammatically illustrated. This circuit receives its energy from a suitable supply of alternating current through the customary hand-actuated switch and fuses. The circuit of the motor 9 comprises the leads M, to which current is normally supplied by the operation of manually actuable push button starting switches, such as indicated at 201 and 203, located at convenient places for actuation by the operator (Fig. 17). Manually actuable push button stopping switches such as 202 and 204 (Figs. 15 and 17) are also provided at convenient points.

Separate motors 205 and 206 (Fig. 17) are provided for driving the turntables T and T$^x$, respectively.

Three electronic timing devices 207, 208 and 209 (Fig. 17) are provided, each comprising a potentiometer or equivalent device TD$^1$, TD$^2$ and TD$^3$, respectively, and each having an actuating knob and a pointer which cooperates with a dial graduated to indicate periods of time. These pointers and dials are conveniently arranged in close proximity on a panel 210 (Fig. 16) mounted on the machine frame. On the same panel may be arranged a brake control handle having a pointer which cooperates with a graduated dial, the dial being graduated to indicate brake torque and the handle operating a potentiometer B$^4$ (Fig. 17) which controls the current in the actuating coil of a magnetic brake and thus determines the braking force to be applied in stopping the machine.

The circuit also comprises emergency switches 211, actuable by conveniently located push buttons, for cutting off current to the motor leads and applying the brake for stopping the motor instantly in case of emergency. Likewise the circuit comprises manually actuable push button switches 212 and 213 (Figs. 15 and 17) for stopping the operation of either picker at will while the feed mechanism of the machine continues to operate, these switches being in circuit with the solenoids S and S$^x$, respectively. The normally open switch 214 (Fig. 17) is closed whenever a bottle passes under the detector 258 (Fig. 3).

In the circuits of the two individual solenoids S and S$^x$ are relay switches 215 and 215$^a$ (Figs. 8 and 17) which are automatically closed by cams on the shaft 12$^a$, turning in time with the shaft F, at that time in the cycle at which a bottle should be in position to be received by the star wheel. Since the pickers act alternately, a cam-actuated switch 216 (Figs. 8 and 17) on shaft 12 operates to direct the current to that one of the solenoids S or S$^x$ which, at any given time, should be acting.

The detector 259, which is near the delivery end of the wiper plate 255 (Fig. 3), actuates a switch 217 (Fig. 17) in the circuit of the timer 207 (Fig. 17). If the switch 217 remains closed longer than a predetermined period determined by adjustment of the pointer TD–1 (Fig. 16), the timer circuit TD–2 is so affected that the machine performs the same cycle as outlined in paragraph "F" above. The switch 218 (Fig. 17) is actuable by lift of the feed gate 247 (Fig. 3) and thereby so affects the timer circuit TD–2 as to occasion the operation outlined in paragraph "F" above.

The feed gate 247 (Fig. 3) at times actuates the switch 220 (Fig. 17). When a bottle jam occurs at the feed gate, the first result is to lift feed gate 247 and operate the switch 218, as above described, but if the jam is of a nature such that the feed gate is lifted abnormally high, corresponding to a condition which might cause serious damage to the bottle or machine, the switch 220 is actuated and thereby stops the machine instantly.

As above noted, the machine is so devised that labels may be delivered alternately from the two magazines, or from either magazine alone, if desired. When delivering in alternation from the two magazines, alternate bottles of the series fed into the machine will receive labels from the right and left magazines, respectively.

As each bottle passes beneath the detector 258 (Fig. 3) it raises the detector and closes the switch 214 (Fig. 17) which is in a feeder line for supplying current to both of the solenoids S and S$^x$. The cam-actuated selector switch 216 (Fig. 17) determines whether current, resultant from closing switch 214, shall be delivered to the solenoid S or the solenoid S$^x$. Since the bottles remain in contact with the detector 258 during only about 30° of the cycle, provision is made for keeping the selected solenoid circuit closed during the remainder of that cycle. For this purpose, the relay switches 215 and 215$^a$ are provided, which keep the selected solenoid circuit closed for the remainder of the cycle after the bottle has disengaged the detector 258. However, if no bottle lifts the detector 258 the corresponding relay switch will not be closed and the solenoid will not be energized and the corresponding picker will not take a label from the magazine.

To permit turning the machine by hand, for example, in making initial adjustments, a removable crank K$^2$ (Fig. 1) is provided. A switch 219 (Fig. 17) of conventional type is arranged to be opened automatically by the insertion of the crank, thereby breaking the electrical circuit to the motor leads M so that the machine can not be started electrically so long as the crank remains in place; thus danger of injury to the operator while making adjustments is minimized.

When the machine is to be started, the pickers should be supplied with adhesive, before they approach the magazine, and bottles should be on their way to the label applying station. Likewise, when the machine is to be stopped, it is desirable that any labels already picked be applied and wiped down before the feed belts 237 and 250 cease to move. It is also desirable that the transfer carriage 60 stop in a neutral position such that neither of the gum transfer rolls 129 or 129$^x$ is in contact with its supply roll 57 or 57$^x$ or with one of the pickers. To this end the control circuit is so designed as automatically to determine how long the feed means shall run before the pickers approach their respective magazines; to stop the machine automatically if a serious jam of bottles occurs beyond the feed gate; and how long the feed shall normally run after the pickers cease to act before the feed stops, and also to insure the stopping of the machine with the transfer carriage in neutral position.

Thus, before starting the machine, the pointer device at TD-3 (Figs. 16 and 17) is so adjusted as to provide a period of not more than a maximum of ten seconds after the feed belts 237 start, before picking of labels commences.

The pointer TD-2 (Figs. 16 and 17) can be adjusted from zero to a maximum of four seconds. This setting determines the time allowed for applying labels which have already been picked and during which such labels may be wiped down after the picking operation has stopped and while the machine is continuing to complete its normal stopping cycle. During this period the motor will normally run after the button 203 has been actuated, but, with the picking stopped, to insure the completion of the wiping of labels already applied. At the end of this timing cycle, the motor automatically stops and the brake is applied. The final stopping is controlled by the switch 221 (Figs. 8 and 17) operated by a cam mounted on the shaft 12. This cam is so set that the machine comes to rest in a neutral position. The pointer at TD-1 (Figs. 16 and 17) may be adjusted from zero to a maximum of one second. The setting of this pointer is such that, if the feeler 259 has been raised and held in the up position by bottles jammed at the delivery end, the entire machine will continue to run for a time sufficient to apply the last label which has been picked before the machine stops.

The manually actuated switches 212 and 213 (Figs. 15 and 17) have off and on positions. These switches are provided to make it possible to stop label picking and applying, even after the machine has entered upon its normal cycle of operations. By turning both switches to the "off" position, the machine will continue to feed bottles through the machine, but without any label picking at all. On the other hand, by setting one or the other of these switches to the "off" position, the machine will continue to operate but will take labels from only one of the magazines.

In the normal operation, as the bottles pass along beneath the wiper 255, each bottle raises the detector 259 and thus closes the switch 217 for an instant, but as this switch is in the electronically controlled timing circuit 207, the machine does not stop as the result of a jamming of the bottles at the delivery end of the machine, unless the detector 259 continues to remain in its raised position for more than the period fixed by the setting of the pointer at TD-1. If such jamming occurs and is not relieved within the selected time interval, the drive circuit is broken and feeding and picking ceases. A normally closed switch 221 (Figs. 8 and 17) is so controlled by a cam on shaft 12$^a$ that when picking is to be stopped by the actuation of any of the aforesaid control devices, except the emergency stops for the motor, the current will not be cut off from the motor leads M until the switch 221 is opened, the opening of the switch by the cam taking place at such a point in the cycle that the machine stops with the gum transfer rolls, carried by the transfer carriage, out of contact with the gum supply rolls and the picker surfaces. Opening the switch 221 also causes the coils of the brake to be energized so that the brake is applied when the motor stops. Since the machine is provided with means for driving it at different speeds, and since it is desirable to avoid adjusting the cam which operates the switch 221, provision is made for manually adjusting the force to be applied by the brake. This adjustment is made by means of the control device B$^4$ (Fig. 17) having the handle B$^5$ (Fig. 16).

The electrical circuit comprises a two-position pointer switch M, marked "hand" and "automatic" (Fig. 15). The purpose of this switch is to provide means whereby the machine may be operated manually by the crank K-2, while either or both sides of the machine complete the picking and applying operation. This is desirable for observing the operation when carried out slowly and for making adjustments, for, when this switch is turned to the "hand" position, the electrical timing devices become inoperative.

For supplying articles of very small diameter, for instance 5/16 of an inch, the turntable feed of Fig. 1 may be replaced by a reservoir such as shown in Fig. 14. In this arrangement the duplex star wheel 233$^m$, 233$^n$ has radial pockets 234$^m$ each of a size to receive one of the articles Y$^m$. The articles to be labeled are placed in the reservoir R$^m$ which is of a horizontal width slightly greater than the length of one of the articles to be labeled. Desirably the spaced, vertical side walls 300 and 301 of the reservoir are of transparent material, for example, sheet plastic or glass so that the quantity of articles remaining in the reservoir may be observed at any time as well as the manner in which the articles are feeding toward the delivery port at the lower part of the reservoir.

The reservoir has vertical end walls and a sloping front which inclines down toward the delivery port at the periphery of the star wheel. The lower edge of the wall 302 is spaced above the edge of the star wheel and a movable gate 303 is arranged below the lower edge 302, the gate having an inner surface which is flush with the inner surface of the wall 302. The lower surface of the gate is approximately coaxial with the star wheel and the gate terminates in an acute edge which is close to the periphery of the star wheel and which defines the upper boundary of the feed port from the reservoir. The inclined floor 304 terminates adjacent to the periphery of the star wheel but at a distance from the acute lower edge of the finger 305, thereby defining the lower boundary of the feed port. When feeding very small articles the reservoir R$^m$ may be provided with a false floor F$^a$ comprising an upper portion which slopes less steeply than the floor 304 and whose upper edge is beveled to fit snugly against the floor 304. The forward portion F' of this false floor slopes steeply down toward the periphery of the star wheel, and its lower edge rests on the floor 304 close to the edge of the star wheel. The angle of slope of part F' may be varied as experience dictates, according to the diameter of the articles to be labeled and the condition of the peripheral surfaces of the articles. For articles of larger diameters than 7/16 of an inch, for example, this false floor may be dispensed with.

The articles are placed in the reservoir, whose top is open for this purpose, with their axes horizontal and flow downwardly by gravity action toward the feed port defined by the lower edge of the gate 305 and the lower edge of the floor 304 and one by one enter the pockets in the star wheel, the pockets being of such dimensions as to accommodate but a single one of the articles. Preferably, as illustrated in Fig. 14, the upgoing corner of each pocket is beveled or rounded so that as the star wheel revolves its periphery may pass beneath the mass of articles presented at the delivery port without danger of jamming.

While desirable embodiments of the invention have herein been disclosed by way of example, it is to be understood that the invention is broadly inclusive of any and all modifications falling within the terms of the appended claims.

I claim:

1. In combination in a labeling machine, means operative to move a series of articles to be labeled one by one along a predetermined path, a plurality of magazines for labels, means operative first to remove a label from one magazine and then to remove a label from another magazine in alternation, and means operative first to transfer a label removed from the first-named magazine to a position relative to said path such that said label contacts one article of the series while said article is at a predetermined position in said path and then to transfer a label removed from the second-named magazine to the same point in said path for contact with another article of said series.

2. In combination in a labeling machine, means operative to move a series of articles to be labeled one by one along a predetermined path, a magazine for labels at each side respectively of said path, a picker associated with each respective magazine, means for so actuating the respective pickers that a label is first removed from one magazine and then a label is removed from the other magazine in alternation, transfer means operative to receive a label first from one picker and then from the other and to transfer all labels so received one after another to the same point in said path, and means for so actuating the transfer means that alternate labels contact even numbered articles of the series, while intervening labels contact odd numbered articles of the series.

3. In combination in a labeling machine, means for moving articles to be labeled along a predetermined path toward and away from a label-applying station, a magazine for labels at each side respectively of said path, a picker associated with each respective magazine, means operative to move the pickers in alternation along parallel paths, a single transfer carriage movable transversely of the paths of the two pickers and which is so designed as to take labels from one or the other of said pickers, and means for moving the carriage thereby to deliver labels received from either picker to the labeling station.

4. In combination, means for supporting an article in position to receive a label from label magazines at opposite sides respectively of said supporting means, a transfer carriage which moves in a path whose opposite ends are adjacent to the respective magazines and whose midpoint is adjacent to an article supported in position to receive a label, and means operative first to remove a label from one magazine and then to remove a label from the other magazine in alternation and to deliver all of the labels so removed from the magazines to the transfer carriage.

5. In combination with means for moving an article along a substantially horizontal path toward and from a label-receiving position, label magazines located at opposite sides of said path, a transfer carriage, means guiding said carriage to move along a path extending transversely of the path along which the articles move, and whose ends are adjacent to the respective magazines, means for reciprocating the carriage along the path defined by said guide means, picker means operative to remove labels from each magazine, means so actuating the picker means that a label is first removed from one magazine and then a label is removed from the other magazine in alternation, the picker means being operative to deliver labels removed from one magazine to the carriage while the latter is adjacent to said magazine and to deliver labels removed from the other magazine to the carriage while the carriage is adjacent to the last-named magazine.

6. In combination in apparatus for applying labels to articles, means for moving articles one by one in series along a predetermined path, two label magazines, one at each side respectively of said path, the magazines being directly opposite to each other, and means operative to take a label first from one magazine and then to take a label from the other magazine in alternation, and means for applying labels from one magazine to the even numbered articles of the series while said articles are moving past a predetermined point in the path, and for applying labels from the other magazine to the odd numbered articles of the series as said articles are moving past the same point in said path.

7. In combination in apparatus for applying labels to cylindrical articles, means for rolling articles in series one after another along a predetermined path, two stationary label magazines one at each side respectively of said path, the magazines being directly opposite each other, means operative to remove a label first from one magazine and then from the other in alternation and to apply adhesive to each label so removed, and means operative so to position each label relatively to the same predetermined point in said path that the adhesive surface of each respective label is adhesively contacted by the circumferential surface of a rolling article as the latter progresses along said path.

8. In combination in apparatus for applying labels to articles, means for advancing cylindrical articles in series along a predetermined path while rotating each article about its own axis, label magazines at opposite sides, respectively, of said path, and means operative to deliver labels to successive articles of the series, as they continue to advance, from magazines located, respectively, at opposite sides of the path and to wrap a label about each article as the latter continue to rotate.

9. In combination in apparatus for applying labels to articles, means for advancing articles one after another in series along a predetermined path and uninterruptedly, stationary label magazines at the opposite sides, respectively, of said path, and means operative to deliver labels from one of the magazines to alternate articles of the series and to deliver labels from the other magazine to intervening articles of the series without stopping the advance movement of the articles.

10. In combination in apparatus for applying labels to cylindrical articles, means for rolling said articles in series along a predetermined, substantially horizontal path, label magazines at opposite sides of said path, a pneumatic transfer carriage which moves transversely of said path and above the latter and which has a flat label-contacting surface parallel to said path, means for reciprocating the carriage, and means operative to deliver labels from the respective magazines in alternation to the carriage while the later is adjacent to the opposite ends, respectively, of its path.

11. In combination in a labeling machine, means operative to support an article at a label-applying station, a pair of label magazines, a picker cooperative with each respective magazine to remove labels one by one therefrom, means for moving the pickers toward their respective magazines in alternation, and means for transferring labels from the respective pickers in alternation to the label-applying station, and means whereby the operation of one picker may be interrupted without interrupting the operation of the other picker.

12. In combination in a labeling machine, means operative to support an article at a label-applying station, a pair of stationary label magazines, independent pickers, each of which cooperates with a corresponding one of said magazines respectively to remove labels one-by-one therefrom, means for moving the pickers toward their respective magazines in alternation, a carriage having means operative to take labels from the respective pickers, and means for moving the carriage from a transfer position relative to either of the pickers, respectively, to a label-delivering position at the label-applying station.

13. In combination in a labeling machine, means operative to support an article at a label-applying station, a pair of label magazines, a picker cooperative with each respective magazine to remove labels one-by-one therefrom, means for moving the pickers toward their respective magazines in alternation, a carriage having a pair of independent suction pads, and means for moving the carriage along a path such that said suction pads are brought alternately into transfer relation to the respective pickers.

14. In a labeling machine, in combination, means defining a path along which articles move toward and from a label-applying station, label magazines located at opposite sides respectively of said path, a picker for removing labels one at a time from each of the respective magazines, a transfer carriage, and means for moving the carriage and pickers in timed relation whereby the carriage may receive a label first from one picker and then from the other in alternation.

15. In a labeling machine, in combination, means defining a path along which articles move toward and from a label-applying station, label magazines located at opposite sides respectively of said path, pickers for removing labels one at a time from each respective magazine, a transfer carriage having a pair of independent transfer pads, and means for moving the carriage back and forth transversely of said path and to cause it to dwell with first one and then the other of said pads located at the label-applying station.

16. In a labeling machine, in combination, means defining a path along which articles move toward and from a label-applying station, label magazines located at opposite sides respectively of said path, pickers for removing labels one at a time from each respective magazine, a transfer carriage having a pair of independent suction pads, means for reciprocating the carriage transversely of said path and to cause it to dwell at each end of said path, the transfer pads being so relatively spaced that when the carriage dwells at one end of its stroke one of said pads is at the label-applying station while the other is in transfer relation to one picker, and when the carriage is at the other end of its stroke the first-named pad is in transfer relation to the other picker and the second-named pad is at the label-applying station.

17. In combination in a machine for labeling cylindrical articles, a carriage having a suction pad provided with a horizontal lower surface for holding an adhesively coated label with its adhesive coating downwardly exposed, a support disposed in a plane below that of the lower surface of the pad and at a distance from said surface approximately equalling the diameter of the article to be labeled, means for delivering articles onto the support with their peripheral surfaces contacting the support and with their axes substantially horizontal, means for moving the carriage in a path parallel to the axis of an article carried by the support, from a label-receiving position to a label-delivering position, and means for so relatively moving the support and an article as to cause the article to pass beneath the pad while rotating about its own axis and while the carriage is in the label-delivery position whereby the label is pulled from the pad and wrapped around the article.

18. In combination in a machine for labeling cylindrical articles, a carriage having a suction pad provided with a horizontal lower surface for holding an adhesively coated label with its adhesive coating downwardly exposed, an endless belt having a horizontal upper run disposed below the pad at a distance therefrom substantially equalling the diameter of the article to be labeled, means for disposing articles upon said upper run of the belt with their peripheral surfaces contacting the belt and with their axes perpendicular to the direction of movement of the belt, means for moving the carriage in a path parallel to the axis of an article carried by the support, from a label-receiving position to a label-delivery position, and means for driving the belt thereby to progress the articles past the pad while the carriage is in label-delivery position and while the articles are turning on their own axes.

19. In combination in a machine for labeling cylindrical articles, a carriage having a suction pad provided with a horizontal lower surface for holding an adhesively coated label with its adhesive coating downwardly exposed, an endless belt having a horizontal upper run disposed at a distance from the plane of the lower surface of the suction pad substantially equal to the diameter of the article to be labeled, means for moving the carriage along a horizontal path extending transversely of the belt and whose mid-point is directly above the belt, means for delivering a label to the pad when the latter is at either end respectively of said path, means for driving the belt, and means for delivering articles one-by-one in spaced relation onto the upper run of the belt with the axes of the articles perpendicular to the direction of motion of the belt.

20. In combination in a machine for labeling cylindrical articles, a carriage having a suction pad provided with a horizontal lower surface for holding an adhesively coated label with its adhesive coating downwardly exposed, an endless belt having a horizontal upper run disposed at a distance from the plane of the lower surface of the suction pad substantially equal to the diameter of the article to be labeled, means for moving the carriage along a horizontal path extending transversely of the belt and whose mid-point is directly above the belt, means for delivering a label to the pad when the latter is at either end respectively of said path, means for driving the belt, a star wheel device for delivering articles one-by-one onto the upper run of the belt, the star wheel having peripheral pockets each shaped to receive one of said articles, means for turning the star wheel in timed relation to the belt, and means for delivering articles into the pockets of the star wheel device.

21. In combination in a machine for labeling cylindrical articles, a transfer carriage having a suction pad provided with a horizontal lower surface for holding an adhesively coated label with its adhesive coating downwardly exposed, an endless belt having a horizontal upper run disposed at a distance from the plane of the lower surface of the suction pad substantially equal to the diameter of the article to be labeled, means for driving the belt, means for delivering articles one-by-one onto the horizontal run of the belt with their axes horizontal and perpendicular to the direction of the motion of the belt, means to prevent endwise motion of the articles as they are rolled along by a belt beneath the suction pad, and means operative to receive the articles delivered from the belt and to convey them toward the discharge end of the machine at a velocity less than the velocity of advance of the article as it is rolled along by said belt.

22. In combination in a machine for labeling cylindrical articles, a transfer carriage having a suction pad provided with a horizontal lower surface for holding an adhesively coated label with its adhesive coating downwardly exposed, an endless belt having a horizontal upper run disposed at a distance from the plane of the lower surface of the suction pad substantially equal to the diameter of the article to be labeled, means for driving the belt, means for delivering articles one-by-one onto the horizontal run of the belt with their axes horizontal and perpendicular to the direction of the motion of the belt, means to prevent endwise motion of the articles as they are rolled along by the belt beneath the suction pad, endless conveyor means having a lesser linear velocity than that of the belt operative to receive articles delivered by the belt and to move them in a rectilinear path, and label-wiping means engageable with the labels on the articles as the latter are so moved by said conveyor means.

23. In combination in a machine for labeling cylindrical articles, a transfer carriage having a suction pad provided with a horizontal lower surface for holding an adhesively coated label with its adhesive coating downwardly exposed, an endless belt having a horizontal upper run disposed at a distance from the plane of the lower surface of the suction pad substantially equal to the diameter of the article to be labeled, means for reciprocating the carriage along a path which extends transversely of the belt, means for delivering a label to the transfer pad while the carriage is at one end of said path, means for driving the belt, means for delivering articles one-by-one onto the horizontal run of the belt with their axes horizontal and perpendicular to the direction of the motion of the belt, means to prevent endwise motion of the articles as they are rolled along by the belt beneath the suction pad, endless conveyor means having a run which forms, in effect, a continuation of the horizontal run of the belt and which receives the articles from the latter and continues to advance them while they rotate about their own axes, the linear velocity of said endless conveyor being less than that of the belt, and a presser plate overlying said run of the conveyor means and which is operative, by contact with the labels on the articles, to press the labels into firm contact with the articles.

24. In combination in a labeling machine, an endless belt having a horizontal run which supports the article while being labeled, means for driving the belt whereby an article is advanced bodily with its axis perpendicular to the direction of motion to the belt, a transfer carriage movable in a path transverse to the belt, the carriage having a suction pad for holding an adhesively coated label with the adhesive surface downwardly exposed, the path of the carriage being so related to the horizontal run of the belt that a label carried by the pad will contact the peripheral surface of an article resting on the belt, when the pad is located directly above the belt, means for reciprocating the carrier so that at one end of its stroke said pad dwells immediately above the belt at the label-applying station, a magazine for labels, and means for transferring a label from the magazine to said pad while the carriage is at the other end of its stroke.

25. In combination in a labeling machine, an endless belt having a horizontal run which supports the article while being labeled, means for driving the belt whereby the article is advanced bodily with its axis perpendicular to the direction of movement of the belt, a transfer carriage moving in a path transverse to the belt, the carriage having two independent suction pads each operative to hold an adhesively coated label with its adhesive surface downwardly exposed, the path of the carriage being so related to the horizontal run of the belt that a label carried by the pad will contact the peripheral surface of an article resting on the belt, a plurality of magazines, one at each side respectively of the belt, means for reciprocating the carriage so that at each end of its stroke one of said pads respectively dwells immediately above the belt at the label-applying station, and means for transferring labels from the respective magazines to corresponding suction pads of the carrier while the carrier dwells at opposite ends respectively of its stroke.

26. In combination in a labeling machine comprising a magazine, a picker for removing labels one by one from the magazine, means for applying adhesive to the labels, an electrical drive motor for the machine, a switch in the motor circuit for stopping the motor and delayed action means interposed between the switch and motor operative to keep the motor in operation for a predetermined period of time after the switch is actuated.

27. In combination in a labeling machine comprising a magazine, a picker for removing labels one by one from the magazine, means for applying adhesive to the labels, an electrical drive motor for the machine, means actuated by the motor for advancing articles to a label-receiving position, a switch in the motor circuit for stopping the motor, and means whereby, upon actuation of the switch, the motor and article-advancing means continues to operate for a predetermined period of time after the picker ceases to function.

28. In combination in a labeling machine comprising a magazine, a picker for removing labels one-by-one from the magazine, means for applying adhesive to the labels, an electrical drive motor for the machine, means actuated by the motor for advancing articles to a label-receiving position, a switch in the motor circuit for stopping the motor, and means operative, upon actuation of the switch, to stop operation of the picker while the article-advancing means continues to operate for a predetermined period of time.

29. A labeling machine comprising means for rolling cylindrical articles in succession past label applying means, and past label wiping means, feed means for advancing the articles, movable picker means for applying labels to the articles and automatic means, comprising an electrical switch, whereby the effective movement of the picker means may be stopped while the feed means continues to operate.

30. A labeling machine comprising means for rolling cylindrical articles in succession past label applying means, and past label wiping means, feed means for advancing the articles, movable picker means for applying labels to the articles, means, comprising an electrical drive motor and means actuable thereby to operate the picker means and the feed means, and automatic means, including an electrical switch and electronic timer for starting the feed means at a predetermined time before the picker means becomes effective to apply a label.

31. A labeling machine comprising means for rolling cylindrical articles in succession past label applying means, and past label wiping means, feed means for advancing the articles, picker means for applying labels to the articles, and means comprising an electrical motor and means actuated thereby to move the picker through a normal cycle in which it takes gum from a supply, removes a label from a magazine and carries the label to a place at which the label is removed from the picker, means actuated by the motor for operating the feed means, and means including an electronic timer for preventing the picker from operatively approaching the magazine during a predetermined period of time after the feed means and picker have started into operation.

32. In a labeling machine of the kind wherein a picker normally receives gum from a supply, takes a label from a magazine and moves the label to a point where the label is stripped from the picker, means for actuating the picker, means operative to restrain the picker from operatively approaching the magazine after the picker actuating means has been started into operation, and an electronic timer for determining the interval of time during which the picker shall be restrained from approaching the magazine after the picker actuating means has been started.

33. A labeling machine comprising means for rolling cylindrical articles in succession past label-applying means and past label wiping means, feed means for advancing the articles, picker means for applying labels to the articles, a detector device which is momentarily displaced by an article in passing the wiping means, means operative to stop the feed means in response to such displacement of the detector, and an electronic timer operative to delay the stopping of the feed means for an adjustable predetermined time after the detector is so displaced.

34. A labeling machine comprising means for rolling cylindrical articles in succession past label-applying means and past label wiping means, feed means for advancing the articles, picker means for applying labels to the articles, the machine including a transfer carriage to which labels are transferred from the picker, means for stopping the machine, and means operative to insure the stopping of the machine at such a point in its cycle of operations that the transfer carriage always comes to rest in the same predetermined position.

35. A labeling machine comprising means for rolling cylindrical articles in succession past label-applying means and past label wiping means, feed means for advancing the articles, picker means for applying labels to the articles, automatic means comprising an electrical switch whereby the operation of the picker means may be stopped while the feed means continues to operate, and an electronic timer for determining the length of time during which the feed means shall continue to operate after the picking means becomes ineffective.

36. In combination in a machine for labeling cylindrical articles, a rotatable wheel having peripheral pockets each of a size and shape to receive one of said articles with the axis of the article parallel to the axis of the rotatable wheel, a reservoir for holding a supply of said articles, the reservoir being so constructed and arranged that the axes of the articles within the reservoir are parallel to the axis of the wheel, the reservoir having a floor which slopes toward the periphery of the wheel and means defining a delivery port closely adjacent to the peripheral edge of the wheel, the means which defines the delivery port comprising a gate having an inner surface which is normally flush with the inner surface of the reservoir wall and a lower surface which is coaxial with the wheel, said inner and lower surfaces of the gate merging at an acute edge located close to the periphery of the wheel, and means for turning the wheel.

37. In combination in a labeling machine as set forth in claim 36, the rotatable wheel comprising two coaxial disks spaced apart a distance less than the length of the article to be labeled, adjacent pockets in the wheel being so spaced that but one pocket at a time is in article-receiving position, the upper corner of each pocket in the wheel being rounded to avoid jamming.

38. In combination, in a machine for applying labels to cylindrical articles, a suction-type transfer device having a horizontal lower face, means for applying a label having an adhesive surface to said lower face of said transfer device so that the adhesive surface of the label is exposed, means for moving the transfer device along a horizontal path to a point of label application and for causing it to dwell at said point, and means for supporting a cylindrical article with its axis horizontal and in a plane perpendicular to the path of travel of the transfer device and at a distance from the adhesive surface of the label equal to the radius of the article, said supporting means providing a path along which the article may roll while its peripheral surface contacts the adhesive surface of the label and thereby wraps the label about the article.

39. In combination, in a machine for applying labels to cylindrical articles, means for rolling an article along a predetermined path with the axis of the article horizontal and at right angles to said path, a transfer device having a horizontal label-holding surface, said transfer device being movable in a path parallel to the axis of an article rolling along said path from a label receiving position to a transfer position where it dwells while holding the label with its adhesive surface exposed and in a plane parallel to the plane of movement of the axis of the article and at a distance from said latter plane equal to the radius of the article, and means for guiding the transfer device to move in a horizontal path perpendicular to the direction of advance of the article.

40. In combination, in a machine for applying labels to cylindrical articles, means for supporting such an article to roll uninterruptedly along a path with the axis of the article horizontal, a rigid label holder having a horizontal under face which is always at a distance from the plane defined by successive positions of the axis of the article substantially equal to the radius of the article to be labeled, means for applying an adhesively-coated label to the label-holder while the latter is at a receiving position so that the adhesive surface of the label is downwardly exposed, and means for reciprocating said holder in a path perpendicular to the path of advance of the article from the label-receiving position to a position where the holder dwells above the path of article advance so that, as an article advances, its periphery will contact the adhesive surface of the label on the holder thereby causing the article to wrap the label about its peripheral surface.

41. That method of applying labels to cylindrical articles which comprises as steps rolling the article to be labeled with its periphery resting upon a support and thus uninterruptedly advancing the article along a path perpendicular to the axis of the article, advancing a label, having an exposed adhesive surface, with said surface in a plane parallel to that plane which is defined by successive positions of the axis of the rolling article and which is at a distance from said latter plane equal to the radius of the article, the label being so advanced that its leading edge is always parallel to the path of advance of the article and causing the label to dwell in a position such that its exposed adhesive surface will be contacted by the rotating article as the latter moves along said path, the first contact of the periphery of the article with the label being along a line which is perpendicular to that edge of the label which was in advance as the label moved toward the applying position.

References Cited in the file of this patent

UNITED STATES PATENTS

| Re. 23,512 | Von Hofe | June 10, 1952 |
| 1,497,576 | Molins | June 10, 1924 |
| 1,937,476 | Milmoe | Nov. 28, 1933 |
| 2,224,098 | Burke et al. | Dec. 3, 1940 |
| 2,311,969 | Schenck et al. | Feb. 23, 1943 |
| 2,509,517 | Neer | May 30, 1950 |
| 2,509,902 | Banks | May 30, 1950 |
| 2,531,314 | Worth | Nov. 21, 1950 |
| 2,543,220 | Ardell | Feb. 27, 1951 |
| 2,600,205 | Carter | June 10, 1952 |
| 2,623,655 | Glans | Dec. 30, 1952 |

FOREIGN PATENTS

| 710,790 | Great Britain | June 16, 1954 |

OTHER REFERENCES

American Brewer, vol. 85, No. 4, April 1952, page 75.